(12) United States Patent
Rozman et al.

(10) Patent No.: US 9,859,085 B2
(45) Date of Patent: Jan. 2, 2018

(54) FAULT PROTECTION DEVICES AND METHODS FOR POWER SYSTEMS

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/862,833

(22) Filed: Sep. 23, 2015

(65) Prior Publication Data

US 2017/0084414 A1 Mar. 23, 2017

(51) Int. Cl.
*H01H 83/02* (2006.01)
*H02H 3/16* (2006.01)
*H02H 3/33* (2006.01)
*H02H 7/26* (2006.01)

(52) U.S. Cl.
CPC .............. *H01H 83/02* (2013.01); *H02H 3/16* (2013.01); *H02H 3/33* (2013.01); *H02H 7/261* (2013.01); *H02H 7/268* (2013.01)

(58) Field of Classification Search
CPC ......... H02M 3/33507; H02M 3/33523; H02M 3/33561; H02M 3/33569; H02M 3/33576; H02M 3/33592; H02M 1/36; H02M 2001/0032; Y02B 70/1433; Y02B 70/1441; Y02B 70/1475; H01H 83/02; H02J 3/36
USPC ............................................ 363/21.01–21.18
See application file for complete search history.

(56) References Cited

U.S. PATENT DOCUMENTS

| | | |
|---|---|---|
| 4,837,519 A | 6/1989 | Lopetrone et al. |
| 6,678,132 B1 | 1/2004 | Carruthers et al. |
| 6,856,137 B2 | 2/2005 | Roden et al. |
| 7,459,914 B2 | 12/2008 | Lindsey et al. |
| 7,626,396 B2 | 12/2009 | Lindsey et al. |
| 7,649,360 B2 | 1/2010 | Ivan et al. |
| 7,978,446 B2 | 7/2011 | Lindsey |

(Continued)

FOREIGN PATENT DOCUMENTS

WO WO-2006/117550 A1 11/2006

OTHER PUBLICATIONS

Extended European Search Report dated Feb. 9, 2017 issued during the prosecution of corresponding European Patent Application No. EP 16190395.0 (7 pages).

*Primary Examiner* — Yemane Mehari
(74) *Attorney, Agent, or Firm* — Locke Lord LLP; Scott D. Wofsy; Christopher J. Cillié

(57) ABSTRACT

A power system includes a direct current (DC) channel connected to a high-voltage direct current (HVDC) bus, an HVDC bus ground fault protection device connected to the HVDC bus, and a DC channel ground fault protection device connected to the DC channel. The HVDC bus ground fault protection device is operatively associated with the DC channel ground protection fault device through the DC channel to cause the DC channel ground fault protection device to disconnect the DC channel from the HVDC bus based on a comparison of current imbalance in the DC channel with a DC channel current imbalance threshold when the HVDC bus ground fault protection device determines that current leakage from the HVDC bus exceeds a current leakage threshold of the HVDC bus.

17 Claims, 4 Drawing Sheets

(56) References Cited

U.S. PATENT DOCUMENTS

| | | |
|---|---|---|
| 8,022,710 B2 | 9/2011 | Ivan et al. |
| 8,040,139 B2 | 10/2011 | Plagens et al. |
| 8,278,934 B2 | 10/2012 | Wang |
| 8,355,226 B2 | 1/2013 | Yoshida et al. |
| 8,598,897 B2 | 12/2013 | Nalbant |
| 8,710,850 B2 | 4/2014 | Fernandez Banares et al. |
| 8,847,603 B2 | 9/2014 | Gajic |
| 2004/0136125 A1 | 7/2004 | Nemir et al. |
| 2012/0327690 A1* | 12/2012 | Melanson ......... H02M 3/33523 363/16 |
| 2014/0132278 A1 | 5/2014 | Tang et al. |
| 2014/0239742 A1* | 8/2014 | Elias ..................... H01H 9/54 307/131 |
| 2014/0268926 A1* | 9/2014 | Gupta ..................... H02M 5/44 363/35 |
| 2014/0347897 A1* | 11/2014 | Broussard ................ H02J 3/36 363/35 |
| 2015/0001942 A1* | 1/2015 | Fang ........................ H02J 7/00 307/64 |
| 2015/0116877 A1 | 4/2015 | Singh et al. |

* cited by examiner

FAULT PROTECTION DEVICES AND METHODS FOR POWER SYSTEMS

BACKGROUND OF THE INVENTION

1. Field of the Invention

The present disclosure relates to electrical power systems, and more particular to ground fault protection devices for electrical power systems.

2. Description of Related Art

Power systems commonly include alternating current (AC) power sources that supply direct current (DC) power to devices requiring DC power through power converters. The power converters convert AC power from the AC power into DC power that may be supplied to one or more DC-powered devices. The AC power may be converted into the high-voltage direct current (HVDC) power that routed to other power converters that change the voltage of the DC power such that it is suitable the DC-powered devices. Electrical isolation between various power system components typically limits current leakage between the power system and ground to a few milliamps or less to prevent current leakage between power system components. In some power systems current leakages can develop within the power system between conductors and/or energized components and ground. In vehicular power systems such leakages can cause the power system neutral-to-ground voltage differential to shift. Current leakages can also occur from distributed capacitance, which can result in the sympathetic or nuisance trips during power system operation. Such current leakage can influence reliability of the power system.

Such conventional methods and systems have generally been considered satisfactory for their intended purpose. However, there is still a need in the art for power systems with improved fault protection. The present disclosure provides a solution for this need.

SUMMARY OF THE INVENTION

A power system includes a high-voltage direct current (HVDC) bus with one or more DC channels connected to the HVDC bus. An HVDC bus ground fault protection device is connected to the HVDC bus and one or more of the DC channels include a DC channel ground fault protection device. The HVDC bus ground fault protection device is operatively connected to the DC channel ground protection fault device through the DC channel such that the DC channel ground fault protection disconnects the DC channel from the HVDC bus based on a comparison of current leakage from the HVDC bus with current leakage threshold of the HVDC bus and a comparison of current imbalance in the DC channel with a DC channel current imbalance threshold.

In certain embodiments, the HVDC bus ground fault protection device can include a current leakage detection module optically coupled to an alternating current (AC) signal injection module. The AC signal injection module can include an isolation transformer connected between positive and return leads of the HVDC bus. An amplifier can be connected to a signal generator to the isolation transformer. A logic module can be connected to the signal generator to enable the signal generator based on optical input from the current leakage detection module. The AC signal injection module can be configured to apply an AC signal to direct current (DC) flowing through the HVDC leads to cause the DC channel ground fault protection device to determine current imbalance in the DC channel.

In accordance with certain embodiments, the current leakage detection module can include a wheatstone bridge connected between the positive and return leads of the HVDC bus. A voltage divider module can connect an absolute value module to the wheatstone bridge. An output of the absolute value module can be connected to first and second voltage comparators. The first voltage comparator can compare the output of the absolute value module to first ground fault threshold reference, and the second voltage comparator can compare the output of the absolute value module to a second ground fault reference that is greater than the first ground fault threshold reference. First and second optocouplers can be connected to the first and second voltage comparators for providing respective inputs to the logic module of the AC signal injection module.

It is also contemplated that, in accordance with certain embodiments, a permanent magnet generator (PMG) can be connected to the HVDC bus through an active rectifier. A disconnect switch can connect the PMG in series with the active rectifier. A disconnect switch can connect the active rectifier in series with the HVDC bus. The AC signal injection module can include a delay module that is configured to open the PMG disconnect switch in the event that the channel ground fault protection determines that the current leakage from the HVDC bus is not associated with current imbalance in the one or more DC channels connected to the DC bus. For example, the HVDC bus ground fault protection module can include a delay module that causes the module to disconnect the HVDC bus from the PMG in the event that current leakage from the HVDC bus does not drop below the current leakage threshold of the HVDC bus within a predetermined delay interval subsequent to application of the AC signal.

It is further contemplated that a solid-state power converter (SSPC) can be connected to the DC channel and can include the DC channel ground fault protection device. The DC channel ground fault protection device can be operatively connected to a DC channel disconnect switch. A DC current sensor can be connected to DC channel, a common mode sensor can be connected to the DC channel, and a disconnect controller can be connected to the DC current sensor such that DC channel ground protection device disconnects the DC channel using inputs from the current sensor and the common mode sensor. A sense winding can be electromagnetically coupled to the positive and return leads of the DC channel. The DC channel ground fault protection device can includes an amplifier connected to the common mode current sensor, a synchronous detector connected to the amplifier, and a comparator connected to both the synchronous detector and a channel reference voltage lead. The comparator can be arranged to output a disconnect signal based on a comparison of the voltage corresponding to current imbalance in the DC channel and a reference voltage received through the channel reference voltage lead.

A method of protecting power systems from ground faults includes receiving HVDC power from an HVDC bus at one or more DC channels, determining whether current leakage from the HVDC bus exceeds a predetermined current leakage threshold of the HVDC bus, and if the determined current leakage exceeds the current leakage threshold of the HVDC bus, then determining current imbalance the one or more DC channels connected to the HVDC bus. In embodiments, the method can include disconnecting one or more of the DC channels from the HVDC bus when current imbalance in the DC channel exceeds a predetermined DC channel current imbalance threshold. In certain embodiments, the method can also include disconnecting the HVDC bus from a power source after a delay time interval during which current leakage from the HVDC bus does not drop below the current leakage threshold of the HVDC.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
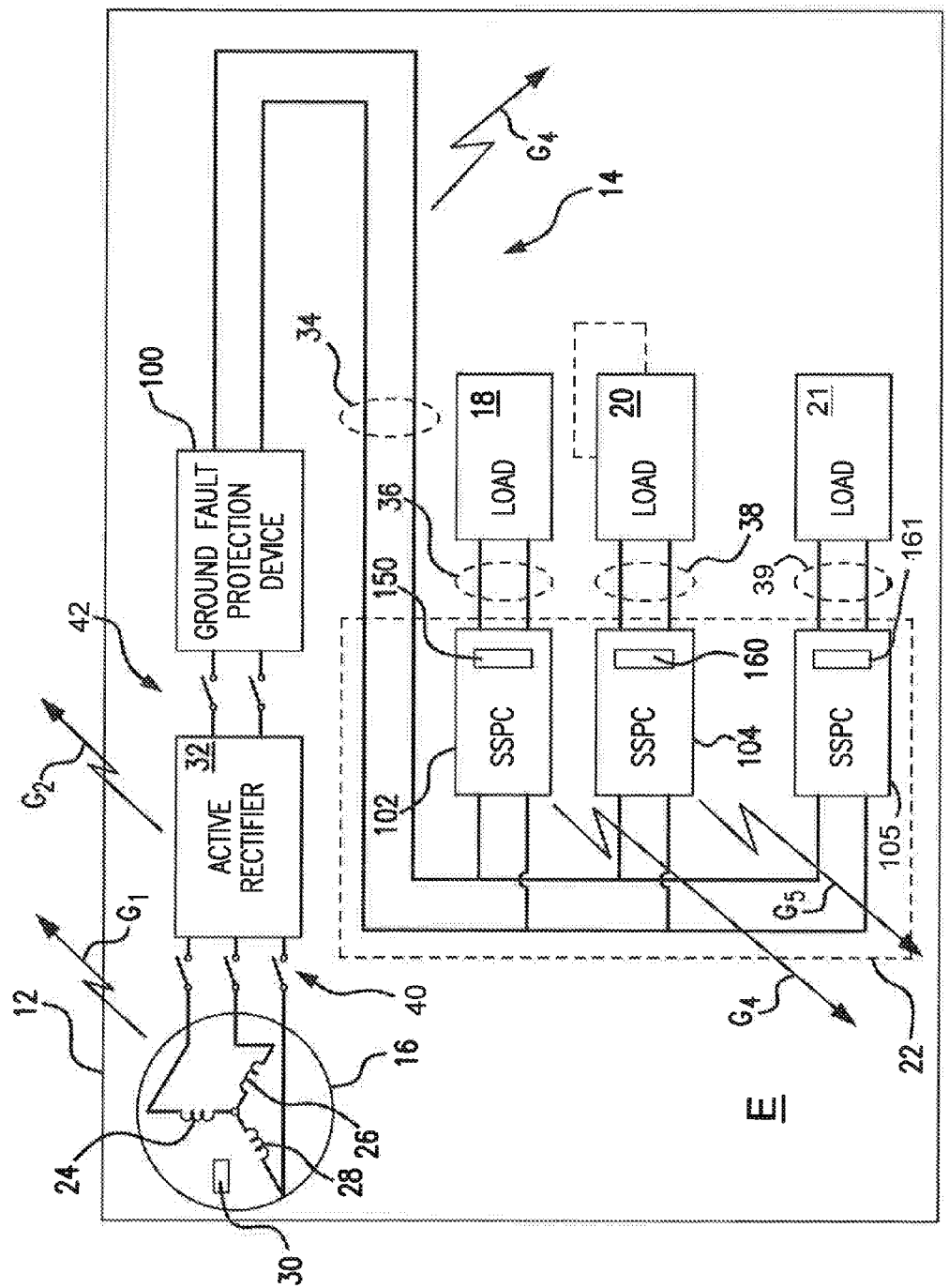
FIG. 1 is a schematic diagram of an exemplary embodiment of a power system constructed in accordance with the present disclosure, showing a bus ground fault protection device and a channel protection device.

Reference will now be made to the drawings wherein like reference numerals identify similar structural features or aspects of the subject disclosure. For purposes of explanation and illustration, and not limitation, a partial view of an exemplary embodiment of a ground fault protection device in accordance with the disclosure is shown in FIG. 1 and is designated generally by reference character 100. Other embodiments of ground fault protection devices and methods of protecting electrical devices from ground fault events in accordance with the disclosure, or aspects thereof, are provided in FIGS. 2-5, as will be described. The systems and methods described herein can be used for electric power distribution systems, such as in power distribution architectures for more-electric vehicles.

Referring to FIG. 1, a power system 10 for a power system 10 is shown. Power system 10 includes a vehicle chassis 12 and a power generation and distribution system 14. Power generation and distribution system 14 includes a generator 16 connected to an active rectifier 32 through a first contactor 40. Active rectifier 32 is connected to a high-voltage direct current (HVDC) power bus 34 through a second contactor 42, and therethrough to a plurality of electrical loads, e.g. a first electrical load 18, a second electrical load 20, and a third electrical load 21, by a power management and distribution system 22. In the illustrated exemplary embodiment, generator 16 includes an alternating current (AC) permanent magnet generator (PMG) with an A-phase winding 24, a B-phase winding 26, and a C-phase winding 28 arranged in a Y-connected stator winding arranged. Generator 16 has a generator neutral 30 that is isolated from vehicle chassis 12.

A-phase winding 24, B-phase winding 26, and C-phase winding 28 are connected to active rectifier 32. Active rectifier 32 is configured to receive AC power from generator 16, convert the AC power into direct current (DC) power, and provide the DC power to a HVDC bus 34. HVDC bus 34 is connected to power management and distribution system 22, and therethrough to a plurality of DC channels, e.g., a first DC channel 36, and a second DC channel 38, and a third DC channel 39. The DC channels provide DC power to DC loads through a solid-state power controller (SSPC) connected to DC channel, e.g., a first SSPC 102 providing power to a first channel load, and a second SSPC 104 providing power to a second channel load, and a third SSPC 105 providing power to a third channel load. Power generation and distribution system 14 is electrically isolated from chassis 12 such that substantially no current flows from power generation and distribution system 14 to chassis 12. The SSPC devices are integral with a power management and distribution system 22 and may include embedded channel ground fault protection devices (shown in FIG. 3).

As will be appreciated by those of skill in the art in view of the present disclosure, in some power distribution systems, gradual or instantaneous breakdown of electrical isolation 'E' can facilitate current flow between elements of electrical power system 14 and chassis 12. Such current leakage, e.g., ground faults, may occur within power converters of power generation and distribution system 14, between conductors of HVDC bus 34 and chassis 12, and between conductors of first DC channel 36 and chassis 12 or second DC channel 38 and chassis 12. For example, wire chaffing, component aging, contaminant intrusion, generator insulation degradation, and/or excessive filtering to ground can cause current to flow to ground through ground faults or through distributed capacitance. Current flowing to ground through distributed capacitance can cause sympathetic tripping during ground faults, and may also cause nuisance tripping during normal operation. Ground faults in high-voltage direct current (HVDC) power systems can also cause the power system neutral-to-ground voltage to shift and/or have different characteristic depending of the location of the ground fault in the power distribution system. Exemplary ground faults are illustrated in FIG. 1 with exemplary ground faults $G_1$ showing a generator ground fault, $G_2$, showing a rectifier ground fault, $G_3$ showing a DC bus ground fault, $G_4$ showing a ground fault on a first DC channel, and $G_5$ showing a ground fault on a second DC channel. As used herein, HVDC refers to voltages carried by conductors and/or electrical components that greater than 300 volts, for example in power distribution architectures carrying voltages between 300 and 600 volts.

Figure 2:
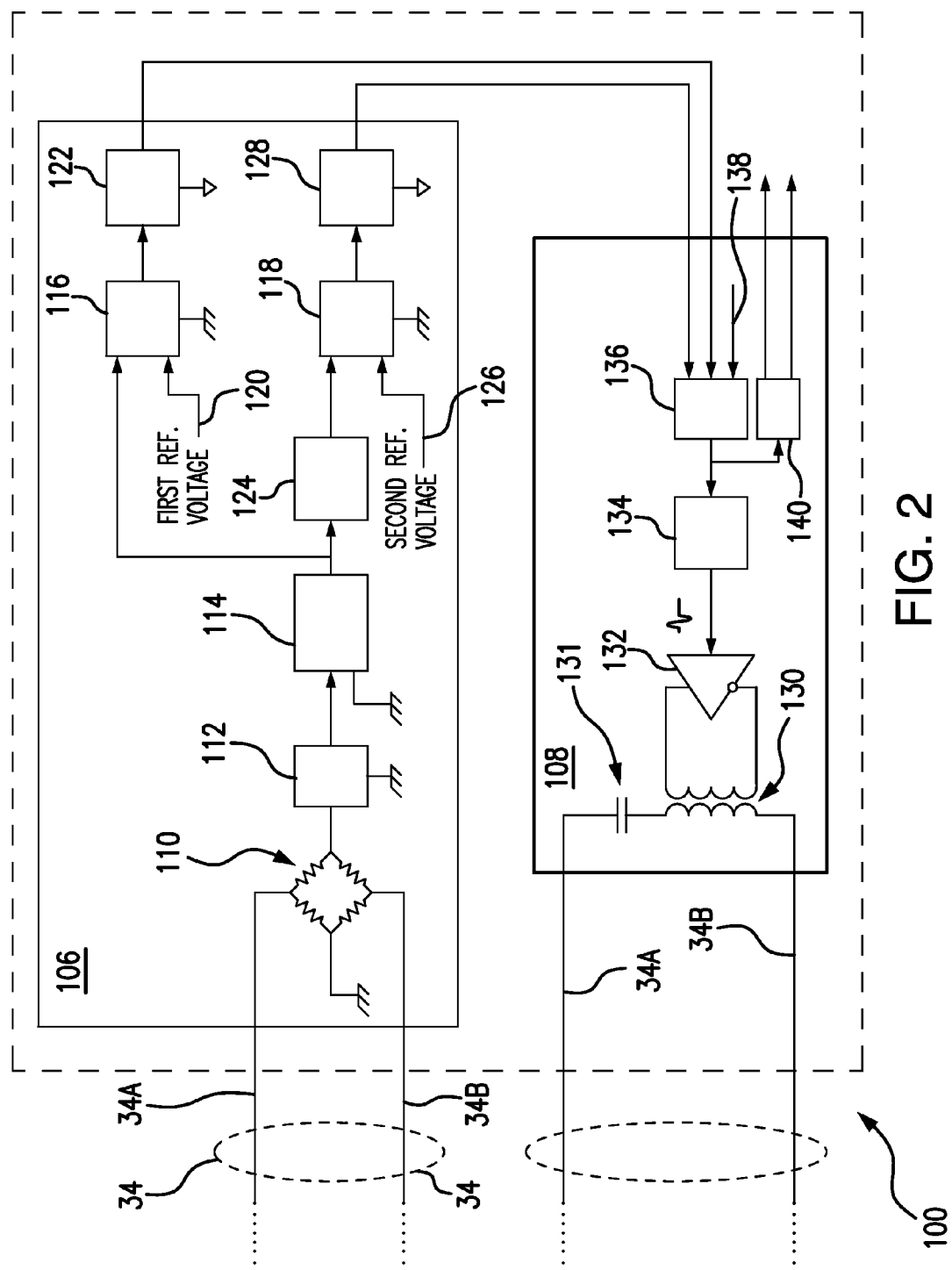
FIG. 2 is a schematic diagram of the bus ground fault protection device of FIG. 1, showing a leakage current detection module and a AC signal injection module of the bus ground fault protection device.

With reference to FIG. 2, bus ground fault protection device 100 is shown. Bus ground fault protection device 100 includes a leakage current module 106 that is optically coupled to an AC signal injection module 108. Leakage current module 106 and AC signal injection module 108 are connected to HVDC bus 34. Leakage current module 106 is configured to determine whether current leakage from HVDC bus 34 exceeds a predetermined HVDC current imbalance threshold. Upon determining that current leakage from HVDC bus 34 exceeds a predetermined current leakage threshold of HVDC bus 34, leakage current module 106 provides an optical indication to AC signal injection module 108 that current leakage from HVDC bus 34 exceeds the current leakage threshold of HVDC bus 34.

Upon receiving such indication from leakage current module 106, AC signal injection module 108 applies an AC signal to HVDC power flowing through HVDC bus 34. DC channel ground fault protection devices are coupled to HVDC bus 34, e.g., DC channel ground fault protection device 150 couples to first DC channel 36 (each shown in FIG. 1), DC channel ground fault protection device 151 couples to second DC channel 38 (each shown in FIG. 1), DC channel ground fault protection device 161 couples to third DC channel 39 (each shown in FIG. 1), receive the AC signal in DC power supplied to the DC channel, measure current imbalances in first DC channel 36 and/or second DC channel 38, and based on the measured current imbalance, determine whether to disconnect first DC channel 36 and/or second DC channel 38 from HVDC bus 34.

Leakage current module 106 includes a wheatstone bridge 110, a voltage divider 112, and an absolute value module 114. Wheatstone bridge 110 is connected between a positive HVDC lead 34A and a negative HVDC lead 34B of HVDC bus 34, and is configured to current leakage within power generation and distribution system 14 by determining current imbalance at different locations within power generation and distribution system 14. Voltage divider 112 is connected to a center point of wheatstone bridge 110. Absolute value module 114 is connected to voltage divider 112, and is configured to output a voltage that corresponds (e.g. is proportional) to current leakage from HVDC bus 34 corresponding to measurements acquired from wheatstone bridge 110.

Absolute value module 114 is connected to a first voltage comparator 116 and a second voltage comparator 118. First voltage comparator 116 includes a first reference voltage lead 120, and is configured to compare voltages received from absolute value module 114 and first reference voltage lead 120. Based on the comparison, first voltage comparator 116 outputs an enable signal to a first optocoupler 122, which is optically coupled to AC signal injection module 108.

Absolute value module 114 is connected to second voltage comparator 118 through a low pass filter 124. Low pass filer 124 and a second reference voltage lead 126 are connected to second voltage comparator 118, which compares the voltage received with a reference voltage received through second reference voltage lead 126. Based on the comparison, second voltage comparator 118 outputs an enable signal to a second optocoupler 128, which is optically coupled to AC signal injection module 108. The second reference voltage received by second voltage comparator 118 through second reference voltage lead 126 is greater than the first reference voltage received by first voltage comparator 116 through first reference voltage lead 120, and corresponds to a bus current leakage threshold associated with power generation and distribution system 14 above which disconnect is warranted. As will be appreciated by those skilled in the art in view of the present disclosure, indication of current leakage from HVDC bus 34 may be indicated by current imbalance between positive and return leads, and may be associated with ground fault.

AC signal injection module 108 includes an isolation transformer 130, an amplifier 132, and a signal generator 134. An enable OR logic module 136 is connected to signal generator 134, and is configured to cause signal generator to output a fixed signal of predetermined frequency for injection through amplifier 132 and isolation transformer 130 on to DC power flowing through HVDC bus 34. In this respect enable OR logic module 136 includes first and second optical inputs, that are individually optically coupled to first optocoupler 122 and second optocouplers 128, and a power-up lead 138, which receives voltage when power generation and distribution system 14 is powered up for self-test purposes. When any one of the leads to enable OR logic module 136 have voltage applied, enable OR logic module 136 causes signal generator 134 to output a signal to amplifier 132. Amplifier 132 applies the signal to HVDC bus 34 through isolation transformer 130, which is connected to HVDC bus 34 through a secondary winding and a DC current blocking capacitor 131.

Figure 3:
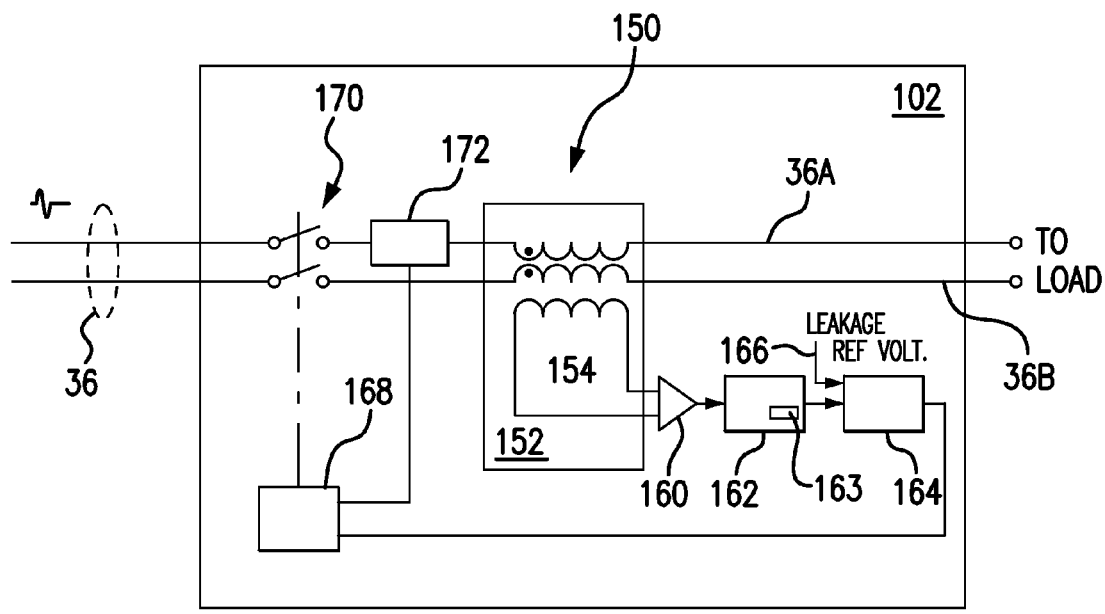
FIG. 3 is a schematic diagram of the channel protection device of FIG. 1, showing a current sensor of channel protection device according to an embodiment.

With reference to FIG. 3, first SSPC 102 is shown. First SSPC 102 includes a DC channel ground fault protection device 150. DC channel ground fault protection device 150 includes a common mode current sensor 152 with a sense inductor 154, a channel positive lead inductor 156, and channel return lead inductor 158. Channel positive lead inductor 156 is connected in series with a DC channel positive lead 36A of first DC channel 36. Channel return lead inductor 158 is connected in series with DC channel return lead 36B of first DC channel 36. Sense inductor 154 is electromagnetically coupled to both DC channel positive lead 36A and DC channel return lead 36B.

Common mode current sensor 152 is sensitive to current imbalance conditions, which in turn may indicate ground fault events (occurrences). Sense inductor 154 of common mode current sensor 152 is connected to an amplifier 160. Amplifier 160 is arranged to apply an amplifier output to a synchronous detector module 162, which converts the amplifier output to a sense voltage corresponding to a current induced in sense inductor 154 by current imbalance between channel positive lead inductor 156 and channel return lead inductor 158. When a ground fault event is initially detected by leakage current module 106 of ground fault protection device 100, and AC signal is placed on HVDC bus 34 to identify the solid-state power converter (i.e. first SSPC 102, second SSPC 104, etc.) responsible for the ground fault event. The AC signal is selected at the output of synchronous detector module 162, which includes a narrow-band selective filter 163. Synchronous detector module 162 applies the voltage to a comparator 164, which compares the voltage to a channel reference voltage received through a channel reference voltage reference lead 166.

Based on the comparison of the sense voltage and the reference voltage, comparator 164 provides a disconnect signal to a disconnect controller 168 operatively associated with a disconnect switch connected in series with first DC channel 36. This causes DC channel ground fault protection device 150 to disconnect first SSPC 102 and loads connected thereto from first DC channel 36. A DC current sensor 172 is also connected in series with first DC channel 36 and is operatively associated with disconnect controller 168 to disconnect first SSPC 102 from first DC channel 36 in the event that overcurrent is detected, such as through incorporation of OR logic into disconnect controller 168. As will be appreciated second SSPC 104 may also include a DC channel ground fault protection device 150 that provides corresponding ground fault protection to second DC channel 38 in response to the AC signal applied to HVDC power provided by HVDC bus 34.

Figure 4:
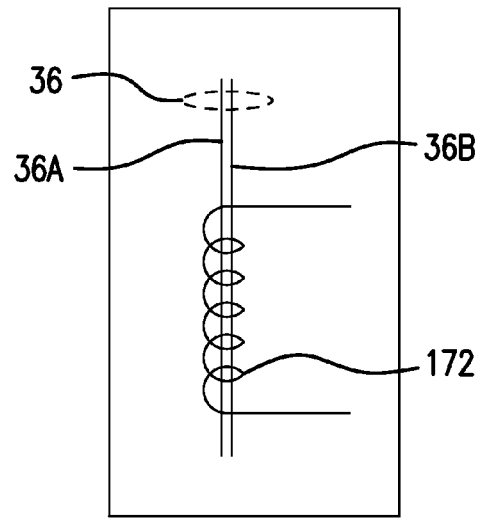
FIG. 4 is a schematic diagram of the channel protection device of FIG. 1, showing a current sensor of channel protection device according to another embodiment.

With reference to FIG. 4, a common mode current sensor 170 is shown according to another embodiment. Common mode current sensor 170 is similar to common mode current sensor 152 with the difference that, instead of three inductors (i.e. channel positive lead inductor 156, channel return lead inductor 158, and sense inductor 154, each shown in FIG. 3), common mode current sensor 170 includes a DC current sensor 172, e.g. a coil, extending about both DC channel positive lead 36A and DC channel return lead 36B and electromagnetically coupled thereto. As above, imbalance in current flows within between DC channel positive lead 36A and DC channel return lead 36B will induce current in DC current sensor 172 of common mode current sensor 170 when the AC signal from AC signal injection module 108 (shown in FIG. 2) is present.

Returning to FIG. 2, AC signal injection module 108 also includes a delay logic module 140. Delay logic module 140 is operatively connected to first contactor 11 of active rectifier 32 (shown in FIG. 1) through a second contractor 42. Upon tolling of rectifier disconnect interval during which current leakage from HVDC bus 34 fails to drop below the current leakage threshold of HVDC bus 34, delay logic module 140 opens a disconnect switch of first contactor 11 and/or second contactor 13. As will be appreciated, opening the disconnect switch disconnects HVDC bus 34 from either generator 16 or from both generator 16 (shown in FIG. 1) and active rectifier 32 (shown in FIG. 1), thereby ceasing current leakage from HVDC bus 34, DC channels connected to HVDC bus 34, and from conductors outside of DC channels connected to HVDC bus 34. In this respect the delay interval provides an escalation in response to the recognition of current imbalance on HVDC bus 34 wherein, in the event that no imbalance is located on a DC channel connected to HVDC bus 34, HVDC bus 34 is disconnected from its power source.

Figure 5:
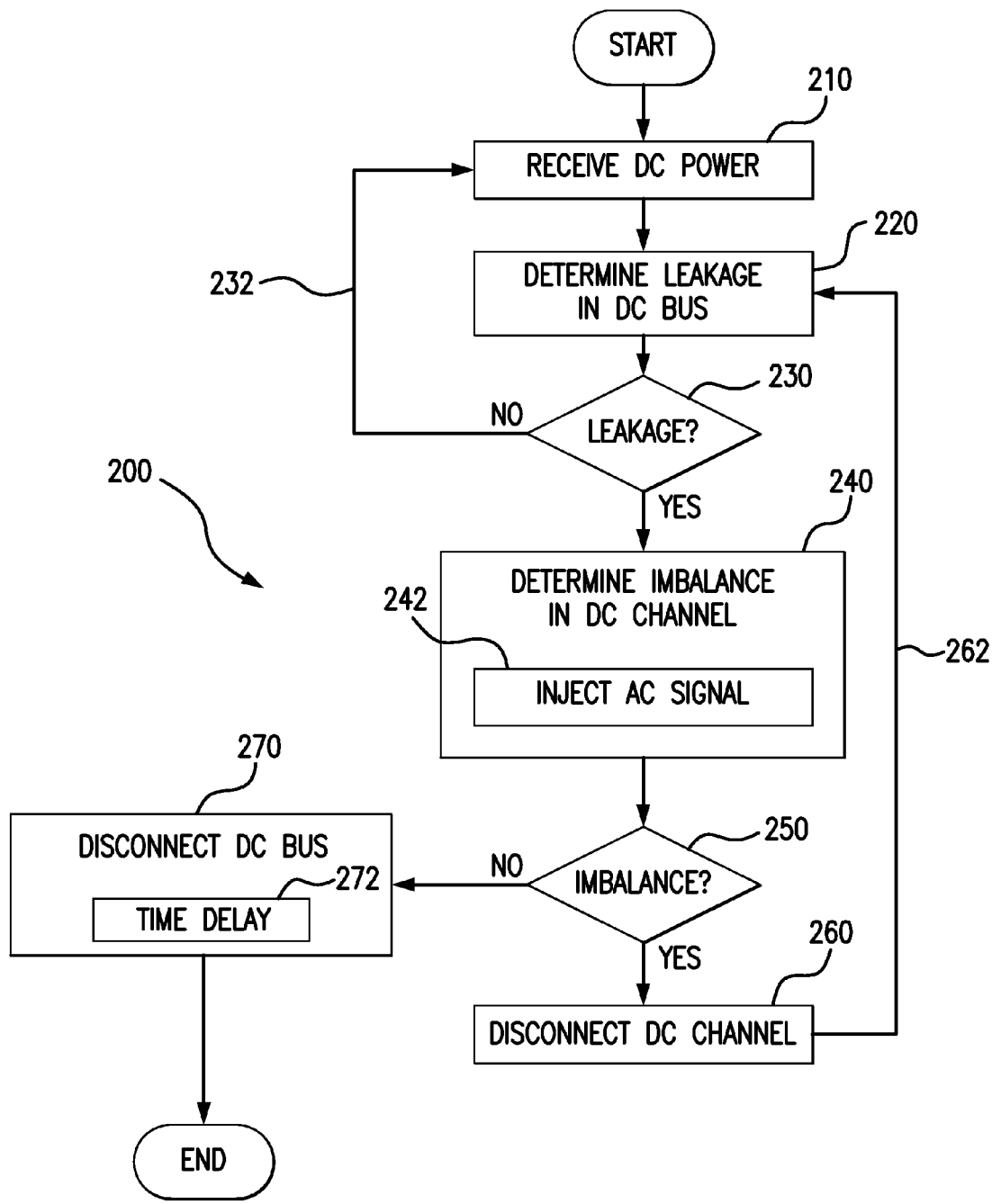
FIG. 5 shows schematically shows a method of protection a power system from ground faults.

With reference to FIG. 5, a method of protecting a power system from ground faults is generally indicated with reference numeral 200. Method 200 includes receiving HVDC power, e.g., through HVDC bus 34 (shown in FIG. 1), as shown with box 210. Current leakage from the HVDC bus is determined, such as by using HVDC bus ground fault protection device 100 (shown in FIG. 1), as shown with box 220. The determined current leakage from the HVDC bus is compared against a current leakage threshold of HVDC bus, as shown with box 230, and if the determined current leakage is below the threshold, monitoring continues as shown with arrow 232.

When it is determined that the current leakage from the DC bus exceeds the current leakage threshold of HVDC bus, current imbalance in one or more DC channels, e.g., first DC channel 36 (shown in FIG. 1) and second DC channel 38 (shown in FIG. 2), is determined, as shown with box 240. This may include causing DC channel ground fault protection devices connected to the DC to determine current imbalance in the respective channels, as shown with box 242. As will be appreciated by those of skill in the art in view of the present disclosure, determining current imbalance in a given DC channel can include measuring and comparing current flow through positive and return leads of DC channels that are connected to the DC bus. Current imbalance in a given DC channel is compared to a DC channel current imbalance threshold, as shown in box 250.

If the determined current imbalance in a DC channel exceeds the DC channel current imbalance threshold for the DC channel, the DC channel is disconnected, as shown with box 260. Imbalance in the DC bus is thereafter checked, as shown with arrow 262, to determine whether disconnecting the DC channel returned current leakage from the HVDC bus to below current leakage threshold of the HVDC bus.

If the determined current leakage from the HVDC channel remains above the current leakage threshold of the HVDC bus, then the HVDC bus is disconnected from the power source, as shown with box 270. It is contemplated that the DC bus be disconnected from the power source after tolling of a time delay interval, as shown with box 272. As will be appreciated by those of skill in the art in view of the present disclosure, the time delay is (a) triggered by the application AC signal to DC power flowing through the DC, and (b) is of sufficient duration to allow the DC channels connected to the DC bus to determine current imbalance within the respective DC channels, but is sufficiently short to prevent damage to power system components.

The methods and systems of the present disclosure, as described above and shown in the drawings, provide for power systems with superior properties including improved ground fault protection. In embodiments described herein, electronic components experiencing ground faults may be isolated from electronic components not experiencing ground faults. In embodiments, ground fault detection may be improved by reducing (or eliminating) sympathetic tripping and/or nuisance tripping. In embodiments, the size of the common mode current sensor may be reduced. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A power system, comprising:
    a DC channel connected to a high-voltage direct current (HVDC) bus;
    an HVDC bus ground fault protection device connected to the HVDC bus; and
    a DC channel ground fault protection device connected to the DC channel,
    wherein the HVDC bus ground fault protection device is operatively connected with the DC channel ground protection fault device through the DC channel and is configured to cause the DC channel ground fault protection device to disconnect the DC channel from the HVDC bus based on current leakage from the HVDC bus and current imbalance in the DC channel,
    wherein the DC channel ground fault protection device includes:
    a common mode current sensor coupled to the DC channel;
    an amplifier connected to the common mode current sensor;
    a synchronous detector connected to the amplifier; and
    a comparator connected to the synchronous detector and a channel reference voltage lead and configured to output a disconnect signal based on a comparison of the voltage corresponding current imbalance in the DC channel and a reference voltage received through the channel reference voltage lead.

2. A power system, comprising:
    a DC channel connected to a high-voltage direct current (HVDC) bus;
    an HVDC bus ground fault protection device connected to the HVDC bus;
    a DC channel ground fault protection device connected to the DC channel,
    wherein the HVDC bus ground fault protection device is operatively connected with the DC channel ground protection fault device through the DC channel and is configured to cause the DC channel ground fault protection device to disconnect the DC channel from the HVDC bus based on current leakage from the HVDC bus and current imbalance in the DC channel; and
    a common mode current sensor coupled to the DC channel, wherein the common mode current sensor includes a sense winding electromagnetically coupled to positive and return leads of the DC channel.

3. The power system as recited in claim 2, wherein the HVDC bus ground fault protection device includes a current leakage module optically coupled to an AC signal injection module.

4. The power system as recited in claim 3, wherein the AC signal injection module includes an isolation transformer connected in series with a DC current-blocking capacitor, the DC current-blocking capacitor being connected between positive and return leads of the HVDC bus.

5. The power system as recited in claim 3, wherein the current leakage module includes a wheatstone bridge connected between positive and return leads of the HVDC bus.

6. The power system as recited in claim 2, further including a power source and a disconnect switch connected in series with the HVDC bus.

7. The power system as recited in claim 6, wherein the disconnect switch is operatively connected to the HVDC bus ground fault protection device.

8. The power system as recited in claim 6, wherein the power source includes a permanent magnet generator alternating current (AC) power source.

9. The power system as recited in claim 6, wherein the power source includes an active rectifier.

10. The power system as recited in claim 2, wherein the HVDC bus ground fault protection device includes a delay module configured to disconnect the HVDC bus from a power source after a predetermined delay interval.

11. The power system as recited in claim 2, wherein the DC channel includes the solid-state power converter, the DC channel ground fault protection device being operative connected to the solid-state power converter.

12. The power system as recited in claim 2, wherein the DC channel ground fault protection device includes:
    a disconnect switch connected to the DC channel;
    a DC current sensor connected to the DC channel;
    a disconnect controller connected to the DC current sensor, the common mode sensor, and the disconnect switch to disconnect the DC channel based on inputs from the DC current sensor and the common mode sensor.

13. A method of protecting a power system from ground faults, comprising:
    receiving direct current (DC) power at a high-voltage DC (HVDC) bus;
    determining leakage current from the HVDC bus;
    determining current imbalance in a DC channel connected to the HVDC bus if the HVDC bus current leakage exceeds a HVDC bus leakage current threshold,
    wherein determining current imbalance in the DC channel includes sensing current flow through the positive and return leads of the DC channel; and
    disconnecting the DC channel from the HVDC bus when the current imbalance on the DC channel exceeds a DC channel current imbalance threshold.

14. The method as recited in claim 13, wherein determining current imbalance in the DC channel includes injecting an alternating current (AC) signal into the DC power.

15. The method as recited in claim 13, wherein determining current imbalance in the DC channel includes determining current imbalance when an AC signal is present in DC power supplied to the DC channel.

16. The method as recited in claim 13, further including disconnecting the HVDC bus from a power source when current leakage from the HVDC bus exceeds the HVDC bus current leakage threshold HVDC bus leakage current threshold for a predetermined time interval.

17. A method of protecting a power system from ground faults, comprising:
    receiving direct current (DC) power at a high-voltage DC (HVDC) bus;
    determining leakage current from the HVDC bus, wherein determining current leakage in the DC channel includes sensing current flow through the positive and return leads of the DC bus;
    determining current imbalance in a DC channel connected to the HVDC bus if the HVDC bus current leakage exceeds a HVDC bus leakage current threshold; and
    disconnecting the DC channel from the HVDC bus when the current imbalance on the DC channel exceeds a DC channel current imbalance threshold.

* * * * *